United States Patent [19]

Bedford

[11] Patent Number: 5,077,081

[45] Date of Patent: Dec. 31, 1991

[54] FRICTION SURFACING A ROTATING HARD METAL FACING MATERIAL ONTO A SUBSTRATE MATERIAL WITH THE BENEFIT OF POSITIVELY COOLING THE SUBSTRATE

[75] Inventor: Gerald M. Bedford, Southsea, United Kingdom

[73] Assignee: Frictec Limited, United Kingdom

[21] Appl. No.: 424,247

[22] PCT Filed: Apr. 15, 1988

[86] PCT No.: PCT/GB88/00294

§ 371 Date: Oct. 13, 1989

§ 102(e) Date: Oct. 13, 1989

[87] PCT Pub. No.: WO88/07907

PCT Pub. Date: Oct. 20, 1988

[51] Int. Cl.$^5$ ............................................. B05D 00/00
[52] U.S. Cl. ..................................... 427/11; 427/445; 228/2
[58] Field of Search .................. 427/11, 445; 228/112, 228/2; 118/244

[56] References Cited

U.S. PATENT DOCUMENTS

| | | |
|---|---|---|
| 3,537,172 | 11/1970 | Voznesesky et al. |
| 3,605,253 | 9/1971 | Calton et al. ............................ 228/2 |
| 3,753,286 | 8/1973 | Lilly et al. ............................ 228/112 |
| 3,899,378 | 8/1975 | Wragg et al. ............................ 228/2 |
| 3,973,715 | 8/1976 | Rust ...................................... 228/112 |
| 4,930,675 | 6/1990 | Bedford et al. ........................ 228/2 |

FOREIGN PATENT DOCUMENTS 1018412 1/1966 United Kingdom .
1102601 2/1968 United Kingdom .

OTHER PUBLICATIONS

Kh. A. tyayar, "Friction Hard Facing Investigated," Avt Svarka, No. 4, pp. 31–35 (translation published in the Automatic Welding vol. 8, No. 4 Apr. 4, 1960).
Ya. M. Kershenbaum et al., "Special Features in the Friction Deposition of Bronze on Steel", Avt Svarka, No. 3, pp. 19–22 (1964).
R. I. Zakson et al., Avt Svarka, No. 3, pp. 48–50, (1965), translation published in Automatic Welding, vol. 18, No. 33, 1965.
N. V. Nogik et al., "Friction Hard Facing of Steel with Stellite V3D", Svar Proiz, 1970, No. 7, pp. 16–17, translation published in Welding Production 1970, vol. 17, No. 7.
E. I. Pluzhnikova et al., "Friction Fracing of Cast Ion on Steel", Metallovedenie i Termicheskava Obrabotka Mettalov, No. 11, pp. 46–47 Nov. 1971, translation published in Metal Science & Heat Treatment of Metals.
G. K. Schreiber et al., "Influence of Friction Surfacing Conditions on Transition Layer Properties in Clad Metals", Svar Proiz, No. 9, pp. 32–33 (1971), translation published in Welding Production, vol. 18, No. 9, 1971.
B. A. Averbukh, "Thermal Effects in Friction Surfacing", Avt Svarka, No. 11, pp. 29–31, (1975), translation published in Automatic Welding, vol. 28, No. 11 (1975).

(List continued on next page.)

*Primary Examiner*—Shrive Beck
*Assistant Examiner*—Benjamin L. Utech
*Attorney, Agent, or Firm*—Lerner, David, Littenberg, Krumholz & Mentlik

[57] ABSTRACT

Deposition of a first relatively hard material on a second material that is relatively soft using a rotating rod, bar, tube or other body without translation of the rotating body relative to a workpiece of the second material is achieved by positively cooling the interface between the body and the workpiece such that a shear layer at which heat is being generated moves away from the surface in the direction of the rotating body. On removal of the rotating body from contact with the workpiece, the workpiece is found to be surfaced with material from the rotating body. In a second stage the already deposited material from the rotating body may be cooled by a surrounding body of liquid to enable further material from the rotating body to be deposited on the workpiece. The workpiece may be of plain carbon steel and the rotating body may be of high speed steel or a nickel-based alloy.

11 Claims, 3 Drawing Sheets

OTHER PUBLICATIONS

K. Fukakusa & T. Satoh, "Travelling Phenomena of Rotational Plane During Friction Welding", Research Report of Fukui Technical College of Natural Science and Engineering, No. 18, Dec. 1984, IIW Document III-806-85.

W. M. Thomas et al., "Friction Surfacing", The Welding Institute Research Bulletin, Oct. 1984, pp. 327-331.

W. M. Thomas, "An Introduction to Friction Surfacing", Paper 66, the First International Conference on Surface Engineering, Brighton, UK 25-28th Jun., 1985.

B. J. Richards, G. M. Bedford and D. A. Jackson, "Hard Facing by Friction Welding" International Institute of Welding Annual Assembly, Boston, UK, Jul. 1984, IWW Document III J-077-84.

G. M. Bedford and P. J. Richards, "Recent Developments in Friction Coating" Conference Proceedings, Royal Society Sep. 1984.

G. M. Bedford, "Friction Surfacing and Its Applications", Materials Engineering Exhibition and Converence, Novotel Hamnersmith, West London, UK, 5th-7th Nov., 1985.

"Friction Process Fuses Facing Surfaces to Steel", Entry by Friction Technology Ltd. Eureka, Dec. 1985.

"Steel's New Coat Wears Well", The Engineer, 5 Dec. 1985, p. 30.

FRICTION SURFACING A ROTATING HARD METAL FACING MATERIAL ONTO A SUBSTRATE MATERIAL WITH THE BENEFIT OF POSITIVELY COOLING THE SUBSTRATE

BACKGROUND OF THE INVENTION

This invention relates to a method for forming a deposit of a first metal on a second metal by friction surfacing.

British Patent Specification No. 572789 (Klopstock) describes a method for joining or welding metals in which a rotating rod or bar of welded metal is fed into contact with the metal part or parts to be treated with such continuity of pressure and is moved relatively thereto at such speed that the frictional heat generated causes the end of the rod or bar and the metal to attain welding temperature. The result is that the metal of the rod or bar becomes deposited on the metal under treatment to form a local enlargement to join two juxtaposed metal parts together or fills in blow-holes or the like in the surface under treatment.

In the Klopstock method, portions of the workpiece encountering the rotating rod or bar as the method progresses are relatively cool whereas the rotating rod or bar becomes softened by heating, so that the workpiece is little affected and material from the rod or bar deposits on the workpiece. Lateral movement—i.e. movement of the rod or bar along the surface of the workpiece in a plane at right angles to the plane in which the rod or bar is brought into contact with the surface—is made at a speed that prevents the build-up of sufficient heat at the interface where the rotating rod or bar butts against the workpiece to soften the workpiece, and accordingly the material of the rotating rod or bar deposits on the workpiece.

Experiments have been reported on the phenomena that occur when a rotating rod or bar is brought into contact with a workpiece in the absence of lateral movement—see Fukakusa and Satoh *"Travelling Phenomena of Rotational Plane during Friction Welding"*, Research Reports of Fukui Technical College Natural Science and Engineering, No. 18 (December 1984). The authors describe how the rotational plane or rubbing surface which is the butted plane of the two specimens travels to the inside of one specimen during a frictional heating process and the distance between the travelling rotational plane and the metal boundary plane (the original butted plane) increases with time until it approaches a saturated value. The specimen into which the plane travels is the one in which there is lower resistance to plastic deformation. The reason why the plane is believed to travel is that there is an initial asymmetrical flow of heat across it so that the plane travels until an equilibrium state is reached in which the flow of heat in each direction balances. Experiments are described with combinations of firstly dissimilar material specimens of the same diameter, secondly similar material specimens with different diameters and thirdly dissimilar material specimens with different diameters.

A problem that is not solved by the teaching of the Fukakusa reference is the deposition without lateral movement of a relatively hard material on a relatively soft workpiece, particularly where the workpiece and the rod tube or bar of hard material are of substantially the same diameter.

SUMMARY OF THE INVENTION

The problem is solved, according to the invention, by a method of forming a surface of a first material on a second material by bringing a rotating body such as a rod, bar or tube of a first material into contact with the surface of the second material by movement in one plane only, characterised in that:

(a) the first material is relatively hard and the second material is relatively soft;
(b) the second material adjacent the contact surface is positively cooled; and
(c) the speed of rotation of the body and the pressure applied at the interface between the body, and the surface are such that a shear layer at which heat is being generated moves away from the surface in the direction of the rod or bar, whereby on removing the rod or bar from contact with the surface, the second material is found to be surfaced with the first material.

BRIEF DESCRIPTION OF THE DRAWINGS

The above description, as well as further objects, features and advantages of the present invention will be more fully understood with reference to the following detailed description of a method of surfacing material, when taken in conjunction with the accompanying drawings, wherein.

DESCRIPTION OF THE PREFERRED EMBODIMENT

Preferably, in accordance with the present invention, the second material extends through means providing both a good conductive pathway for heat and mechanical support for the second material. Geometries that may effectively be used include a stud on a plate, formation of a tip on a rod and forming a valve seating. Combinations of materials that can be used include high speed steel on mild steel and Stellites on stainless steel, mild steel or low alloy steel. Applications include the formation of hardened working surfaces on small tools such as screwdrivers, drills and punches, forming arrays of wear-resistant studs on a workpiece, tipping valve ends. The substrate may be in the form of a round bar or it may be of other shapes of engineering interest e.g. hexagonal, square or rectangular. The small over-hanging regions of mechtrode do not inhibit the development of interface movement. Continuous contact between mechtrode and substrate in the plane of the interface has been found not to be an essential to successful operation. Thus the rotating body may be circular in end view and the substrate may be non-circular in end view. Deposited mechtrode material lying outside the envelope of shape of the substrate may be ground off subsequently.

It has now been experimentally established that annular hardfacings can be formed on substrates using a rotating member having a tubular end in contact with the substrate. The substrate may, for example, be the seat region of an internal combustion engine valve or a flow control valve or a circular blade e.g. of a meat slicing machine. The term "rotation" as used herein refers to relative movement and the member may be fixed and the substrate rotated—e.g. keeping a tubular mechtrode fixed and rotating a substrate valve against it.

A touchdown technique using tubular rotating members or "mechtrodes" can produce coatings of annular geometry with thicknesses up to 2.5 mm or above depending upon the materials used and the cycle times. The tube face abutting the substrate is made square for simple plane geometries but can be chamfered to a shallow angle for geometries involving both recesses and inclined surfaces. It has been found that a tubular mechtrode can be re-used on a number of occasions without dressing. It has also been found that a monolithic tubular mechtrode can be used and alternatively e.g. for larger sized mechtrodes a quasi-tubular mechtrode can be made from individual lengths of coating material in a holder. The presence of narrow slots or gaps (e.g. of width 0.5 mm) between the lengths does not inhibit the development of interface movement. The mechtrode can also be made from a plain tube tipped by an attached annulus or attached annular regions of hardfacing material with intervening slots.

The same range of substrates and coating material can be used as in International Publication No. WO 87/04957. Additionally a corrosion resistant sealing material such as Monel metal can be deposited onto various sheets.

Positive cooling of the substrate has been found to be essential if the appropriate interface movement is to take place to build up the required coating thickness. The process is faster than other thick coating processes. This difference increases as the diameter of the required coating annulus increases. The process has no start or finish line so that there is no inherent flaw or source of weakness in the coating produced. There is no theoretical limitation on the diameter of the coating produced, subject to availability of mechtrodes and machine power.

We have also found that the deposited mechtrode material may be continuously built up to a substantial or "semi-infinite" depth if conductive cooling through the deposited material is brought about after conductive cooling through the workpiece of second material has become effective. The invention therefore also provides a method as aforesaid in which deposition of the rotating body takes place in a first phase in which the rotating body and the second material are in face to face contact with cooling of the interface by conduction through the second material and a second phase in which the interface between the first and second material is cooled by a body of liquid maintained immediately below said interface to cool said interface through the previously deposited material. The second stage is begun immediately after the first has proceeded to build e.g. 2-4 mm. of coating so that the two stages are continuous one with another. The invention also contemplates a situation where the interface is immersed in water, although that is less desirable.

The invention will now be described with reference to the following examples:

EXAMPLE I

Figure 1:
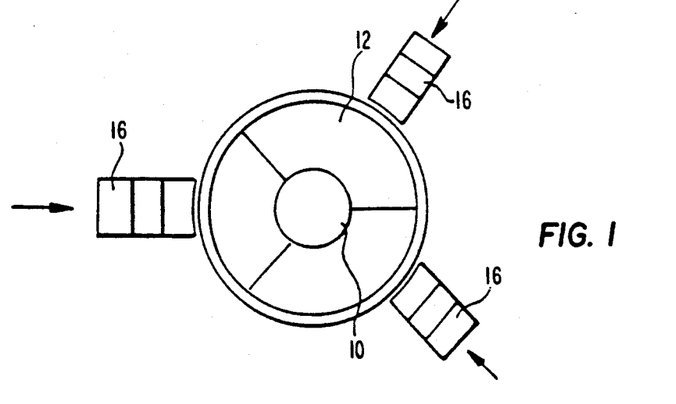
FIG. 1 is a diagrammatic top plan view of a workpiece holder in accordance with one embodiment.
Figure 2:
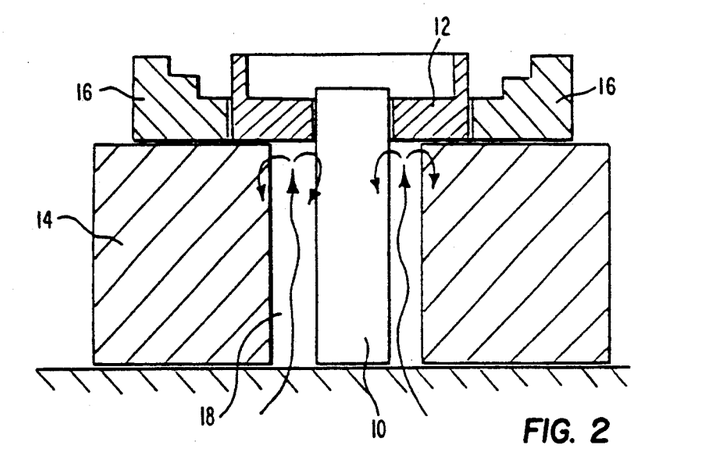
FIG. 2 is a diagrammatic cross-sectional view of the workpiece holder of FIG. 1.

In FIGS. 1 and 2 which are respectively a diagrammatic plan and a section of a workpiece holder pump shaft 10 of plain carbon steel extends through a continuous ring 12 of copper or mild steel or other high-melting well-conducting material having radial slits to make it compressible. The ring 12 is held on a support 14 by three chuck jaws 16 which are radially movable and provide compressive forces on the shaft 10 which projects slightly proud of the top face of ring 12, values of 0.5-1.0 mm being typical. The support 14 beneath the ring 12 has a bore 18 for circulation of water or other coolant to the lower face of ring 12. The shaft 10 is supported at its base by suitable means.

In operation the jaws 16 are tightened towards the shaft 10, compressing the ring 12 so that it is held securely against rotation and axial movement, additional support against downward movement being provided by support at the base of the shaft. Cooling water is circulated through the space 18 and a so-called "mechtrode" or rotating bar of BTI high speed tool steel is lowered into contact with the projecting end of shaft 10. The mechtrode is rotated in a coating machine as described in International Patent Publication No. WO 87/04957 with the difference that the mechtrode moves only vertically and not laterally. A zone of plasticised material immediately develops on the end of shaft 10 and simultaneously the interface or travelling plane between the rotating mechtrode and static substrate moves axially away from the end of the shaft 10. This occurs because of the heat transfer behaviour that has been established between the shaft and the mechtrode. The plain carbon steel of the shaft is a relatively good conductor of heat, and the copper ring is an excellent conductor of heat and when cooled by the flow of cooling water acts as a heat sink rapidly removing the heat energy from the shaft, thereby maintaining the shaft material stiff because it remains relatively cool. The tool steel mechtrode is of relatively stiff or non-deformable material when at room temperature but on contact with the shaft rapidly becomes heated to above the austenite transition temperature at which it becomes very soft and plastic. Accordingly a layer of plastically deforming material is created between the static substrate and the rotating mechtrode or coating rod. A temperature profile is formed in this material axially of the shaft because the part of the layer nearer to the shaft is positively cooled by the action of the copper ring 12 and the part of the layer nearer to the mechtrode does not cool so rapidly because there is nothing positively removing heat, only the relatively poor natural conductivity of the mechtrode. This difference in heat flow is accentuated because the heat path from the shaft 10 is both axial along the shaft 10 and radial via the ring 12 whereas the heat path from the interface is only axially along the mechtrode. Most of the heat in the shaft 10 in fact flows out radially because firstly the maximum relative velocities are at the outside of the mechtrode with attendant maximum heat generation compared to the centre of the shaft and mechtrode where there is no relative motion, and secondly the copper disc 12 is such a good heat conductor. The shaft 10 stays relatively cool and is only slightly deformed whereas it is the material of the mechtrode that is plasticised, by reason of the controlled heat flow now provided. The boundary or shear layer at which the heat is being generated is caused to move along the mechtrode in the direction opposite to the shaft because the heat sink cools the deposited metal, forcing the shear interface to move towards the softest and hottest material until equilibrium state is approached where the heat flow to opposite sides of the shear interface balances. The practical effect is that the shear layer moves rapidly at first and progressively more slowly over a period of 10-15 seconds building a deposit of 3-4 mm of high speed steel on the plain carbon steel.

A significant metallurgical advantage is that the high speed steel is hot worked during coating whilst in the austenite phase and then rapidly cooled, assisted by the heat ring 12. The deposit has a fine microstructure with attendant good properties—in particular a very full array of fine complex carbide particles in a matrix of very fine martensite (in the case of a high speed transformable tool steel) which on subsequent tempering is enhanced by secondary hardening. The size of the carbides in the matrix is such that there are relatively few carbides of size above two microns with a very uniform distribution of carbide through the matrix. The fineness of the microstructure gives good wear properties. Because the austenite which is present at the equilibrium condition of the mechtrode during coating is hot worked at very high strain rates, it has a very fine microstructure which on the immediately following rapid cooling transfers to an equally fine martensitic structure.

It is a particular feature of this method that the shaft and mechtrode can be of the same diameter as well as the mechtrode, if desired, being smaller than the shaft.

EXAMPLE II

The procedure of Example I is repeated except that the coated shaft is immersed in liquid nitrogen for 24 hours followed by two one-hour treatments at 560° C. Secondary hardening thereby takes place.

EXAMPLE III

The procedure of Example I is repeated except that the substrate is a Diesel exhaust valve stem of nickel based alloy (Inco 80 A) and the mechtrode is of Stellite 6 (a cobalt/chromium/tungsten/carbon alloy containing C=1, W=5, Cu=26, Co=balance, (available from Stoody Deloro Stellite of Swindon U.K.) or is of Trisstelle 2 (an iron based alloy also available from Stoody Deloro Stellite). Deposition heights of typically 0.5 mm-2 mm are achievable.

EXAMPLE IV

A substrate in the form of a 316 stainless steel plate as a simulation of a valve/blade material was rigidly supported on a water-cooled cooper plate so that an effective thermal contact was established therebetween. A rod of Stellite 6 (a cobalt-chrome alloy available from Deloro-Stellite) of diameter 18 mm was machined to form a tubular end portion of wall thickness 4 mm. The rod was placed in the jaws of a friction surfacing machine and pressed with its tubular end into contact with the stainless steel plate at a rotational speed of 500 r.p.m. and a pressure of 25 KN. The contact was maintained for the periods indicated below and lead to deposition of stellite annuli of thickness indicated below.

| Time (Sec) | Thickness (mm) |
| --- | --- |
| 20 | 1.0 |
| 15 | 0.5 |
| 10 | 0.2 |

The above experiment was repeated except that the copper plate was replaced by a one quarter inch uncooled 316 stainless steel plate. A negligible amount of Stellite was deposited and the substrate was "blued" and deformed. It was concluded that positive cooling of the substrate lead to a useful interface movement from the substrate giving rise to a Stellite deposit of potential practical utility on account of its thickness and that the thickness could be controlled simply by processing time, once the optimum combination of r.p.m. and pressure had been achieved.

EXAMPLE V

Example IV was repeated except that the rotating member was tubular Stellite of 32 mm diameter and 4 mm wall thickness. The member was applied to the substrate in a two stage process: firstly a relatively short (4 secs) "touchdown" phase using a combination of high rotational speed (750 r.p.m.) and moderate pressure (230 KN) to heat the interface materials to a plasticised state and secondly a growth phase using a lower rotational speed (300 r.p.m.) and higher pressure (40 KN) for the time periods and with the coating thickness indicated below:

| Time (Sec) | Thickness (mm) |
| --- | --- |
| 20 | 2.2 |
| 15 | 1.6 |
| 10 | 0.5 |

The coated plates were sectioned and polished and it was observed that the Stellite had adhered with a well-bonded interface free from discontinuities. The deposit was thick and homogeneous with a fine carbide distribution and a very fine matrix structure.

EXAMPLE VI

In order to simulate a poppet valve of an internal combustion engine a 32 mm disc of stainless steel having a depending stem and machined from bar stock was chucked onto a water cooled 6 mm copper plate. The disc had a flat peripheral recess with a 45° shoulder leading into a rising central region simulating a true valve stem. The depth of the recess was 2 mm and its width was 4 mm to the shoulder. A tubular Stellite "mechtrode" or rotating tube was engaged with the recess for a 4-second touchdown phase and a 20 second growth phase resulting in a coating of Stellite over 2 mm thick filling and well adhering to the recess. The coating was sufficiently thick to be machineable to a finished valve seating geometry.

EXAMPLE VII

The procedure of Example VI was repeated except that the tubular Stellite was formed with narrow slits parallel to its axis at 20 mm intervals to define a multiplicity of separate fingers. A satisfactory Stellite coating was achieved.

It is believed that for large diameter valves a satisfactory coating can be achieved using a multiplicity of fingers of Stellite or other hard metal held rigidly in a supporting jig.

It is also believed that instead of being horizontal the recess can have a small inclination angle which reduces the proportion of the finished coating that has to be removed to form the seat which can save in finishing cost and coating material wastage. The angle should not be such that the tube splays out the losses contact with the recess edge.

EXAMPLE VIII

Figure 3:
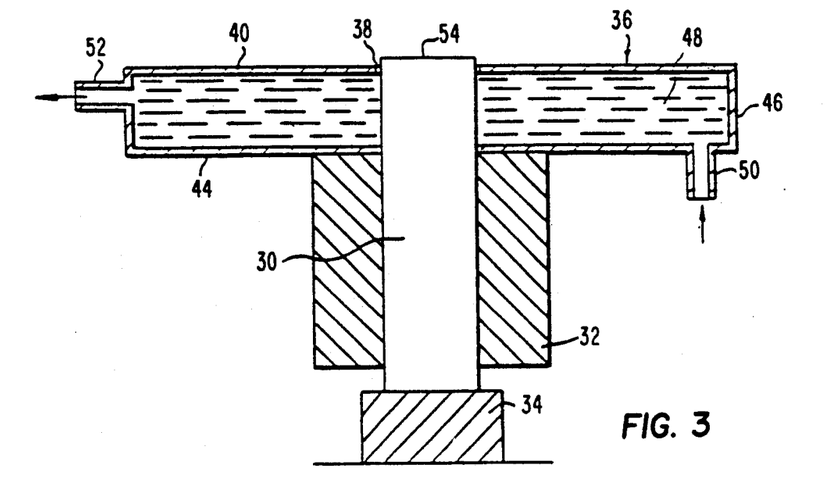
FIG. 3 is a diagrammatic cross-sectional view of a workpiece holder in accordance with a second embodiment including a first cooling jacket.

In FIG. 3 which is a diagrammatic section of a workpiece holder, a punch blank or other workpiece 30 is supported with top clearance in work holder 32 such as a vice or three-jaw chuck and supported at its lower end by means of a back stop 34. An annular cooling jacket 36 is a loose sliding fit over a region of the workpiece 38 upstanding from the work holder 32 for positive cooling of the workpiece. The cooling jacket 36 has a central aperture 38 through which the workpiece 30 projects. The cooling jacket 36 may be of mild steel or copper and has an annular base plate 44 and side wall 46 defining a cavity 48 into which water or other cooling fluid is admitted through inlet 50 and outlet 52. The top end face of the workpiece projects 0.5-1 mm above the top plate 40. The thickness of the top plate 40 is such that there is a distance of 2-4 mm between the water or other cooling fluid in the cavity 48 and the top edge 54 of the workpiece. If the distance between the cooling fluid and the workpiece top edge 54 is too great there is excessive "roll-over" 56 (FIG. 6B) at the top edge of the workpiece because of insufficient cooling whereas an insufficient thickness of the top plate 40 renders it prone to distortion. The amount of roll-over 56 formed on the workpiece 30 during mechtrode treatment is a function of the amount that the top face 54 projects above the cooling jacket 36 and the distance between the top face of the cooling jacket 36 and the body of water or other coolant in the cavity 48. A small amount of roll-over 56 is useful to avoid an undercut forming at the interface between the workpiece 30 and the deposited mechtrode material. The total stickout or projection of the workpiece 30 from the work holder 32 is minimised to avoid vibration of the workpiece 30 during mechtrode coating and movement of the workpiece 30 out of alignment with the mechtrode. Application of a mechtrode to the workpiece 30 under similar conditions to Example I results in the formation of a deposit of mechtrode material on the workpiece 30 with interface movement away from the workpiece 30 to allow a thicker deposit to develop.

EXAMPLE IX

Figure 4:
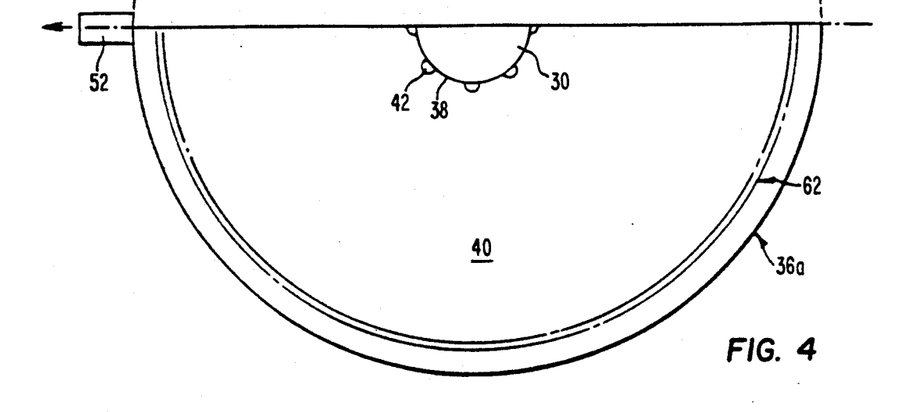
FIG. 4 illustrates schematically a partial top plan view of a second cooling jacket for use in accordance with another embodiment.

This example illustrates the use of water-cooling in the region of the interface to allow a deposit of mechtrode material on the workpiece to develop that is of substantial depth. In FIG. 4 a modified cooling jacket, is shown in plan that has a pattern of slots 42 leading from the central aperture 38 through which the workpiece 30 projects. A water retainer 62 of C-section defined by a sidewall 64 and a base 66 has a central aperture through which the workpiece 30 projects and bounded by a series of slots 68 leading therefrom that correspond to the slots 38 of the cooling jacket 36a. The workpiece 30 projects upwardly through the floor 66 of the water retainer 62, and the cooling jacket 36a and the water retainer 62 are in an initial angular position such the slots 38, 68 are skew and water or other cooling fluid cannot enter the space 70 above the base 66. An overflow 72 leads excess fluid from the interior space 70 of the water retainer 62.

Figure 5:
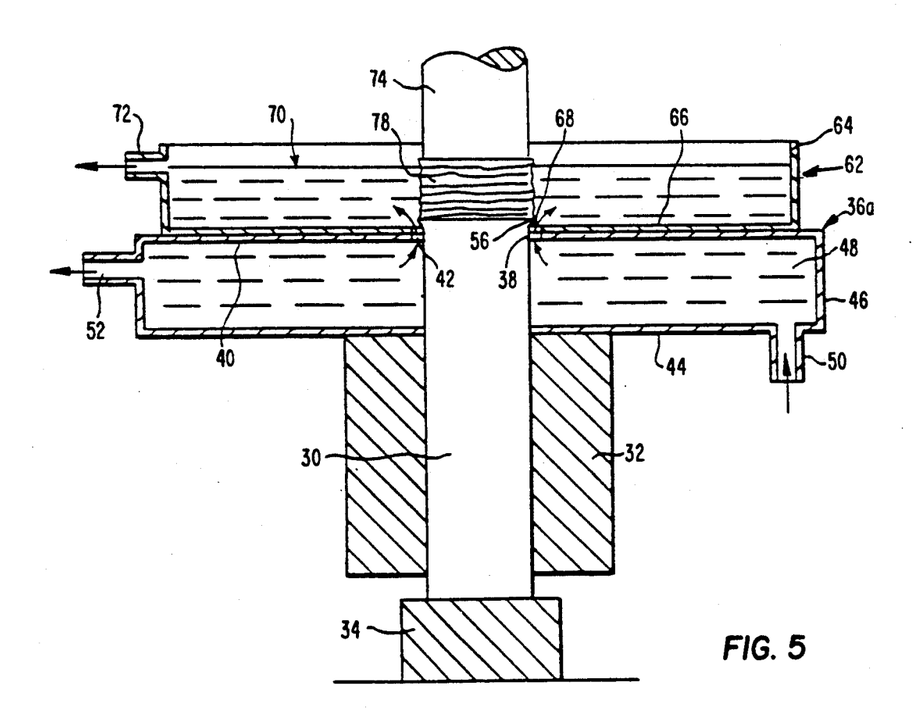
FIG. 5 illustrates schematically a cross-sectional view of the workpiece holder of FIG. 4 including the first and second cooling jackets.

Initially the mechtrode 74 is lowered into contact with the workpiece 30 with no water present in the space 70, and build up of mechtrode material at the interface is begun. A roll-over 56 forms at the top face of the mechtrode 30 which has the advantage of helping to direct spray outwardly during subsequent operation. The water retainer 62 is now rotated to align the slots 48, 68 and admit water to the space 70 about the interface between workpiece 30 and the mechtrode 74 and the admission of water is controlled so as to maintain the water at a level about 2-3 mm below that of the interface as the interface gradually rises. Water entering the space 70 and continues the positive cooling of the interface beyond the position where cooling from the body of water in the chamber 48 by conduction through the workpiece 30 is effective. The heat balance of the interface remains out of equilibrium and encourages further movement of the interface until a considerable deposit 78 of mechtrode material on the substrate is achieved. The maximum height of the deposit depends upon the preset maximum height of water in the retainer 62 but up to 10 mm has been deposited during a 30 second run using similar materials and conditions to Example I. The cooling water also ensures that in the case of high speed steels the deposit 78 has a martensitic structure that only needs tempering in similar manner to Example I. Workpieces of up to 30 mm have been treated as described, the maximum diameter being limited by the available machine power. The shearing action of the mechtrode 74 during deposition ensures a fine microstructure. This improved microstructure is believed to be particularly helpful in larger diameter workpieces where conventionally produced (hot rolled and heat treated and ground) HSS is very prone to bonding. The process might be used, for example, to make tools of larger size such as milling cutters and punches.

Figure 6A:
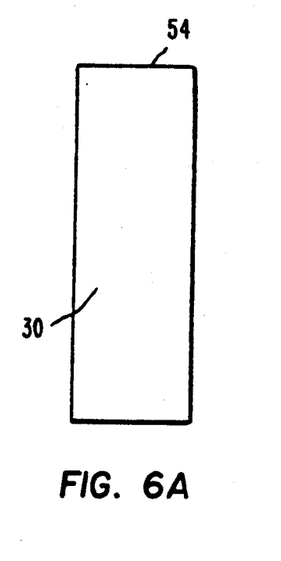
FIGS. 6A–C show diagrammatic side elevational views of a workpiece before and during deposition of a material in accordance with the present invention.
Figure 6B:
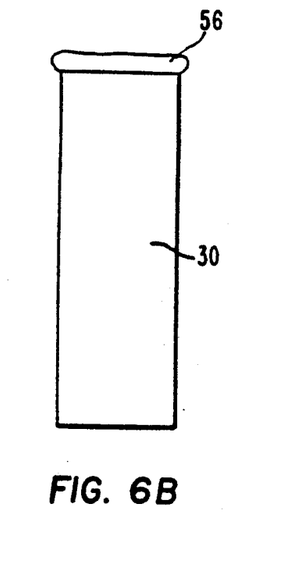
Figure 6C:
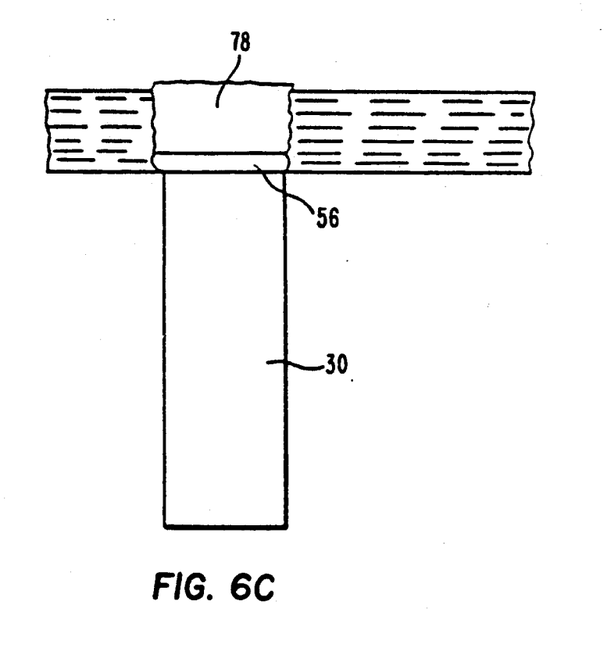

In FIG. 6 which is a diagrammatic side view of the workpiece view A is before touchdown of the mechtrode 74, View B is of an initial phase of operation where an initial deposit of mechtrode material has formed with a roll-over 56 and view C is a view of the subsequent water cooling phase of operation in which the relatively thick deposit 78 forms.

I claim:

1. A method of forming a surface of a first material on a second material by bringing a rotating body of the first material into contact with the surface of the second material, the first material being harder than the second, both said materials being metals, and the second material adjacent the contact surface being positively cooled, wherein:
   (a) relative movement between the rotating body the surface of the second material is only in a direction parallel to the axis of rotation of the rotating body, and
   (b) by virtue of
      (i) the cooling, and
      (ii) the speed of rotation of the body and the pressure applied at the interface between the body and the surface,
a shear layer at which heat is generated moves away from the surface along the rotating body, whereby on removing the rotating body from contact with the surface the second material is surfaced with the first material.

2. A method according to claim 1, comprising forming on the surface of the second material a deposit of the first material of thickness at least 0.2 mm.

3. A method according to claim 1 or 2, wherein the second material projects through and is supported adjacent the surface in a body of copper providing a heat path and providing mechnical support for the second material.

4. A method according to claim 3, wherein the body of copper is in compression to hold the second material.

5. A method according to claim 1, wherein the first material is a relatively hard material providing metal carbides in a matrix based on a metal or alloy selected from the group consisting of iron, cobalt and nickel, and the second material is low alloy steel or mild steel.

6. A method according to claim 5, wherein the first material is a high speed transformable tool steel that is applied without melting at an austenitising temperature at high rates of strain, the resulting fine microstructure transforming to carbides of size about 2 microns or below uniformly distributed in a very fine martensitic matrix, the applied first material being tempered to achieve secondary hardening.

7. A method according to claim 1, wherein the substrate is stainless steel and the relatively hard material is a cobalt/chromium/tungsten/carbon alloy.

8. A method according to claim 1, wherein the first and second materials are rods of substantially the same diameter and/or the body of the first material is in the form of a tube that deposits an annulus on the second material.

9. A method according to claim 1, wherein the deposition of the rotating body takes place in a first phase in which the rotating body and the second material are in face-to-face contact with cooling of the interface by conduction through the second material and a second phase in which heat is removed from the interface between the rotating body and the second material by a body of liquid maintained immediately below said interface to cool said interface through the previously deposited material.

10. A method according to claim 9, wherein the cooling liquid is water.

11. A method according to any of claims 1, 2, or 5-10, wherein the rotating body is circular in end view and the substrate is non-circular in end view.

* * * * *

UNITED STATES PATENT AND TRADEMARK OFFICE
CERTIFICATE OF CORRECTION

PATENT NO. : 5,077,081

DATED : December 31, 1991

INVENTOR(S) : Gerald M. Bedford

It is certified that error appears in the above-identified patent and that said Letters Patent is hereby corrected as shown below:

Title page, item [54] and col. 1, line 2, after "A", insert --SOFTER--.

On the title page, before [51], insert --FOREIGN APPLICATION PRIORITY DATA
April 15, 1987 [GB].......8709056
November 5, 1987 [GB].....8725968--.

Signed and Sealed this

First Day of June, 1993

Attest:

MICHAEL K. KIRK

Attesting Officer

Acting Commissioner of Patents and Trademarks